(12) United States Patent
Alznauer et al.

(10) Patent No.: US 6,677,536 B2
(45) Date of Patent: Jan. 13, 2004

(54) CABLE BUSHING

(75) Inventors: Miroslaw Alznauer, Wies (DE); Frank Gutmann, Freiburg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/066,789

(22) Filed: Feb. 6, 2002

(65) Prior Publication Data

US 2002/0121390 A1 Sep. 5, 2002

Related U.S. Application Data

(60) Provisional application No. 60/275,711, filed on Mar. 15, 2001.

(30) Foreign Application Priority Data

Feb. 6, 2001 (DE) .......................... 101 05 544

(51) Int. Cl.[7] ................................. H01B 17/26
(52) U.S. Cl. ............................. 174/152 R; 174/35 R; 174/35 GC; 174/152 G
(58) Field of Search .................. 174/152 R, 35 R, 174/35 GC, 251, 73.1, 99 R, 107, 140 R, 142, 152 G, 154, 167, 168, 189, 65 G

(56) References Cited

U.S. PATENT DOCUMENTS

| | | | |
|---|---|---|---|
| 2,170,393 A | * | 8/1939 | Tornblom .................. 126/314 |
| 2,936,187 A | * | 5/1960 | Peterson .................. 174/65 SS |
| 4,360,704 A | * | 11/1982 | Madry .................. 174/102 SC |
| 4,481,697 A | * | 11/1984 | Bachle ..................... 24/135 R |
| 4,668,477 A | | 5/1987 | Nishio et al. |
| 4,719,359 A | | 1/1988 | Rose |
| 5,122,068 A | * | 6/1992 | Koss ......................... 439/785 |
| 5,920,035 A | * | 7/1999 | Haney et al. ........... 174/152 G |
| 6,150,607 A | | 11/2000 | Weyl et al. |

* cited by examiner

Primary Examiner—Anthony Dinkins
Assistant Examiner—Jinhee Lee
(74) Attorney, Agent, or Firm—Jones, Tullar & Cooper, P.C.

(57) ABSTRACT

A cable bushing which is small, simple and cost-effective as possible, having a cable, a housing, though which the cable is led, and which has a radially inwardly extending step at its first end, a first sleeve, which engages around the cable and which has a first section arranged inside the housing. The first sleeve is held by the step in the housing, the first sleeve bearing in a seal-forming fashion against the cable and there being a sealing means between the step in the housing and the fist sleeve. A second sleeve is arranged in the interior of the housing and has a first cylindrical section which engages closely around the cable, the first sleeve having a second section which adjoins an end of the first section which faces the step, said second section bearing on the first section of the first sleeve, and an attachment element by means of which the second sleeve is pressed against the first sleeve.

6 Claims, 4 Drawing Sheets

CABLE BUSHING

CROSS REFERENCE TO RELATED APPLICATION

This application relies for priority on a prior filed provisional application, filed Mar. 15, 2001, and assigned Appln. Ser. No. 60/275,711.

BACKGROUND OF THE INVENTION

1. Field of the Invention

The invention relates to a cable bushing for a measuring probe.

2. Background Discussion

Measuring probes, for example pressure measuring probes, are frequently used by introducing them into a container on a cable for example. The cable is used here to form an electrical connection to the measuring probe and for its mechanical attachment. Particularly suitable for this are cables which have on the outside a metallic shield which is surrounded example, by a plastic. The supply lines andlor signaling lines can then lead in the interior of the shield, protected against external influences to the probe.

The cable leads from the probe out of the container to a superordinate unit, for example a power supply and/or further electronics.

One application is the filling level measurement using a pressure measuring probe. Here, the pressure measuring probe is introduced on the cable into a container filled with a material. The pressure determined by the pressure measuring probe corresponds to the height of the material above the pressure measuring probe and is therefore a measure of the filling level in the container.

In these applications, in order to provide a seal, for example to ensure that no material escapes or penetrates downstream electronics and/or a superordinate unit, a cable bushing is necessary which has a housing through which the cable is led. The housing can be part of the superordinate unit here and/or also part of an attachment device for the probe, by virtue of the fact that the housing is mounted at the measuring location, for example on a container, by means, for example, of a flange or a thread.

The cable bushing can equally be arranged on the probe and connected, for example, to the probe or a probe housing, and ensure that no substance penetrates the probe.

SUMMARY OF THE INVENTION

An object of the invention is to provide a cable bushing for a probe which is as small, simple and cost-effective as possible.

For this purpose, the invention consists in a cable bushing for a probe having a cable, a housing, through which the cable is led, and which has, at a first end, a step which extends radially inward, a first sleeve, which engages around the cable and which has a first section arranged inside the housing, the first sleeve bearing against the cable in a seal-forming fashion, and a sealing means being provided between the step in the housing and the first sleeve, a second sleeve, which is arranged inside the housing, which has a first cylindrical section which engages closely around the cable, which has a second section which adjoins an end of the first section which faces the step, which bears on the first section of the first sleeve, and an attachment element, by means of which the second sleeve is pressed against the first sleeve.

According to one embodiment, the attachment element is a ring nut screwed into the housing in the direction facing the step.

According to another embodiment, the second sleeve is metallic and is pressed with the cable in order to provide strain relief to the cable.

According to a further embodiment, the cable is surrounded on the outside by a metallic shield, the second sleeve is metallic and the second sleeve forms an electrically conductive connection between the housing and the metallic shield.

According to yet another embodiment, the first sleeve is composed of a plastic, the cable has a coating made of a plastic and the first sleeve is welded to the coating.

According to a first preferred embodiment, the step in the housing is a radially inwardly extending shoulder, and the sealing means is a seal which bears on the shoulder, which is clamped in between the shoulder and the first section of the first sleeve.

According to a second preferred embodiment, the step in the housing is a radially inwardly extending shoulder, and the sealing means is provided by means of an inner edge of the shoulder onto which the first section of the first sleeve is pressed by means of the attachment element.

According to another embodiment, a spring is clamped in by means of the attachment element and exerts on the first sleeve a force in the direction facing the step.

According to yet a further embodiment of the development, the spring bears on an annular plate which bears on the first sleeve.

According to a third preferred embodiment, the step in the housing has a conical inner casing surface whose diameter decreases in the direction of the first end of the housing, the first sleeve is composed of an elastomer, the first section of the first sleeve has a conical region, and the first sleeve is pressed against the step in the housing by the attachment element in such a way that the conical region of the first sleeve presses against the conical casing surface of the housing and the first housing bears in a seal-forming fashion against the housing and the cable.

According to a particular embodiment, the housing has a first part which comprises the first end of the housing, and a second part, the second part is screwed onto the first part in the direction facing the step, the attachment element is a radially inwardly extending step arranged in the interior of the second part, which bears on the second sleeve and which presses the second sleeve in the direction facing the step as a result of the second part being screwed on.

One advantage of the invention consists in the fact that the cable bushing has a very small number of small-dimensioned components.

A further advantage consists in the fact that in the cable bushing according to the invention, not only is there a strain relief for the cable but also at the same time the shield is connected to ground or to a reference potential via the housing.

The invention and its advantages will now be explained in more detail with reference to the figures in the drawing in which four exemplary embodiments are illustrated; identical elements are provided with the same reference symbols in the figures.

DESCRIPTION OF THE PREFERRED EMBODIMENTS

Figure 1:
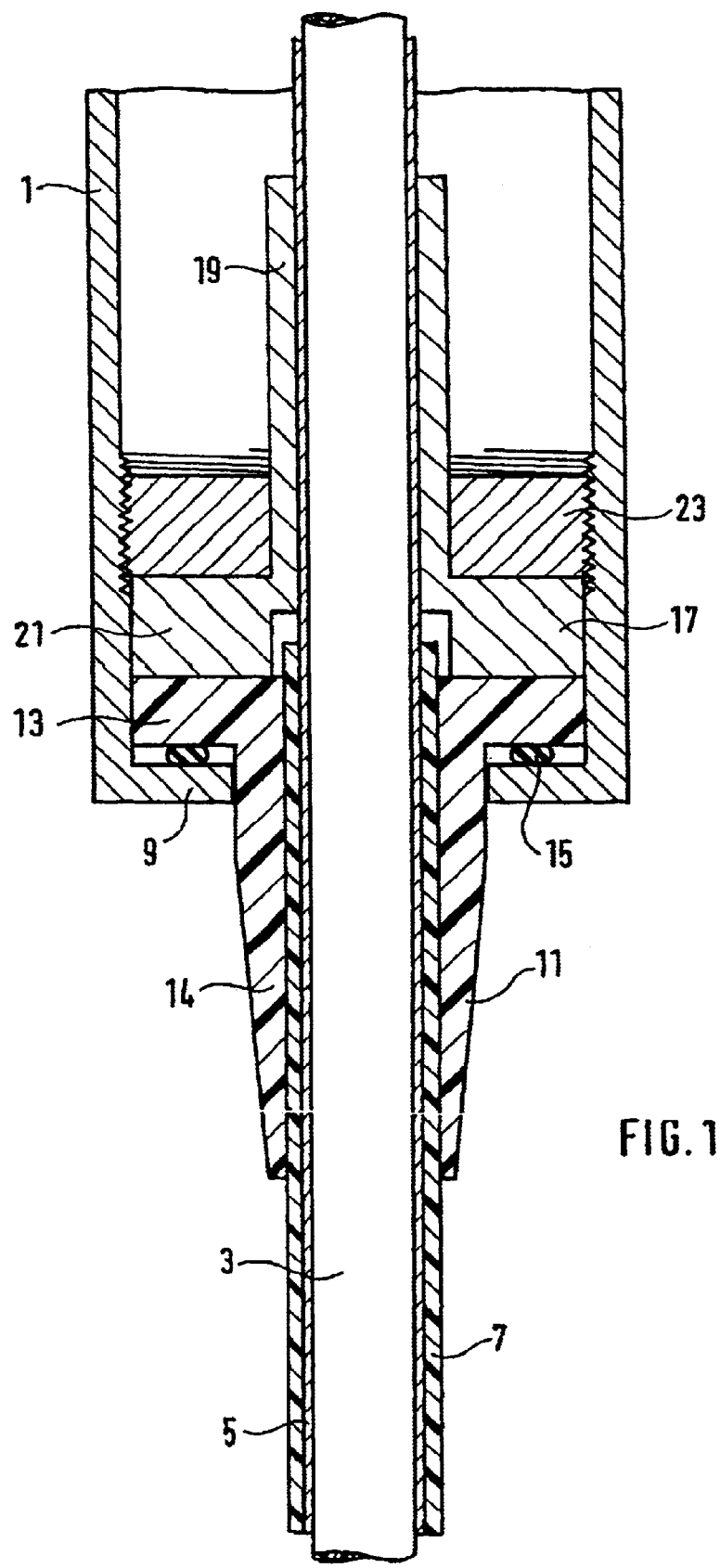
FIG. 1 shows a schematic view of a cable bushing having a first sleeve which is welded to a cable in which a seal is arranged between the housing and the first sleeve.

FIG. 1 shows a schematic view of a cable bushing according to the invention for a probe. It has an essentially cylindrical housing 1 through which a cable 3 is guided.

The cable 3 is used for the mechanical attachment and electrical connection of a probe (not illustrated in FIG. 1), for example a pressure measuring probe. Lines (not illustrated in FIG. 1) run in the interior of the cable 3 and are used to make the electrical connection. The lines are surrounded by a metallic shield 5, for example a wire mesh. The shield 5 is covered with a cable jacket 7 made of a plastic, for example made of polyethylene (PE).

The housing 1 has, at a first end, a radially inwardly extending step. In the exemplary embodiment illustrated in FIG. 1, the step is a shoulder 9 which extends radially inward.

A first sleeve 11, which engages around the cable 3, is provided. The sleeve 11 is composed of a plastic. It is preferably composed of the same plastic as the cable jacket 7 of the cable 3, that is to say for example of polyethylene (PE).

The sleeve 11 has a first section 13 which is arranged inside the housing 1 and a second section 14 which is arranged outside the housing.

The first sleeve 11 bears in a seal-forming fashion against the cable 3. In the exemplary embodiment illustrated in FIG. 1, this is achieved by the sleeve 11 being welded to the cable jacket 7 of the cable 3.

Furthermore, a sealing means is present between the step in the housing 1 and the first sleeve 11. In the exemplary embodiment illustrated in FIG. 1, this sealing means is a seal 15, for example an O ring, which bears on the shoulder 9 in the housing 1 and is clamped in between the shoulder 9 and the first section 13 of the first sleeve 11.

A second sleeve 17 is arranged on the side of the first sleeve 11 facing away from the step, in the interior of the housing 1. The second sleeve 17 is composed of a metal, for example a stainless steel. It has a first cylindrical section 19 which engages closely around the cable 3. Furthermore, it has a second section 21 which adjoins an end of the first section 19 which faces the step and which bears on the first section 13 of the first sleeve 11.

The cable jacket 7 of the cable 3 is removed on a side of the first sleeve 11 facing away from the step, and the second sleeve 17 is fitted onto the exposed metallic shield 5. In order to provide strain relief to the cable 3, the second sleeve 17 is pressed with the cable 3.

The second sleeve 17 preferably forms an electrically conductive connection between the housing 1 and the metallic shield 5. For this purpose, the second section 21 of the second sleeve 17 is shaped in such a way that it is in contact with the housing 1 and as a result produces an electrically conductive connection. In the exemplary embodiment illustrated in FIG. 1, the second section 21 of the second sleeve 17 has an external diameter which is equal to an internal diameter of the housing 1. The conductive connection to the cable 3 is provided by pressing the metallic second sleeve 17 onto the metallic shield 5. This electrical connection ensures that the metallic shield 5 is at the same potential as the housing 1 to protect the lines running in it against electromagnetic interference. This can be, for example, ground or a fixed reference potential.

Figure 2:
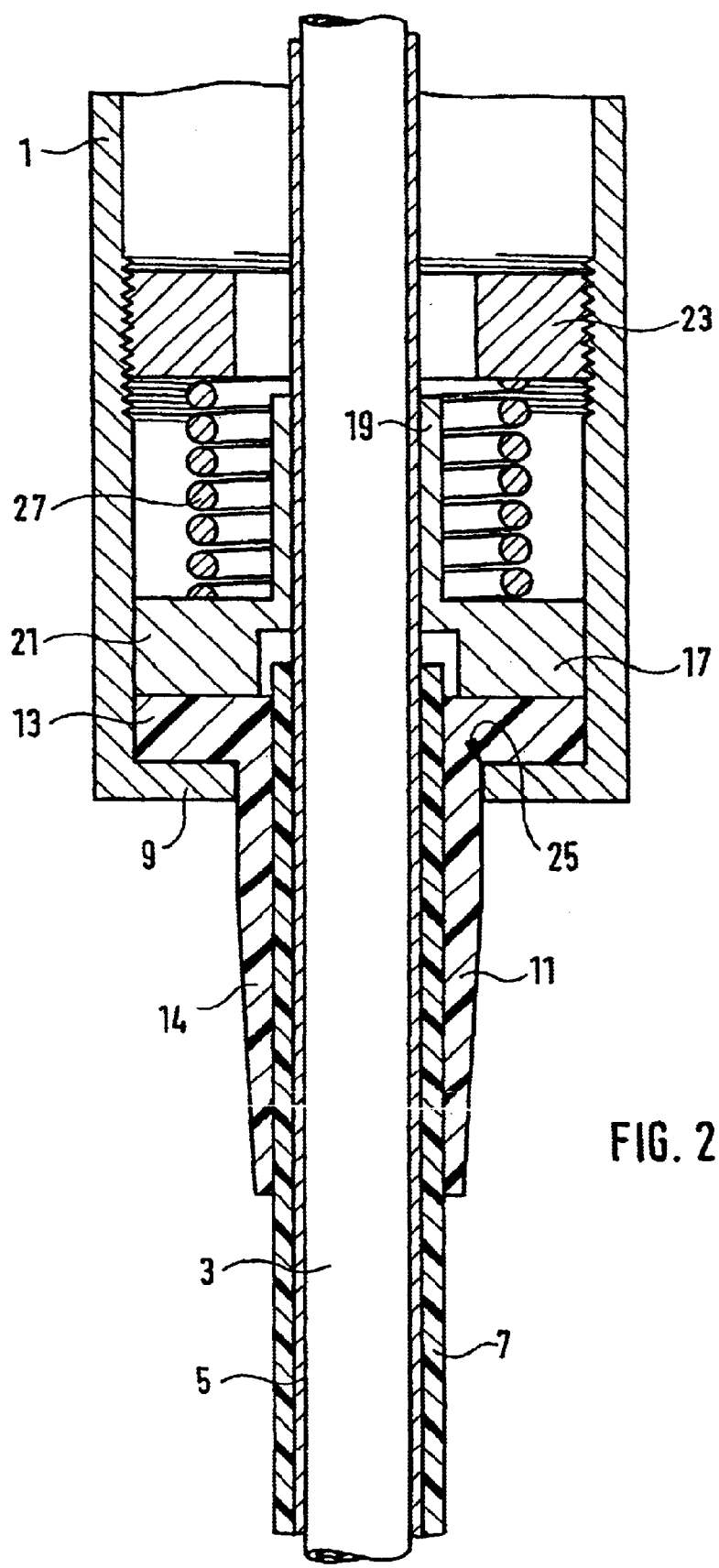
FIG. 2 shows a schematic view of a cable bushing having a first sleeve which is welded to a cable, in which the sleeve bears in a seal-forming fashion on an inner edge of the housing.

In the housing 1, an attachment element is provided by means of which the second sleeve 17 is pressed against the first sleeve 11. In the exemplary embodiment illustrated in FIG. 1, the attachment element is a ring nut 23 which is screwed into the housing 1 in the direction facing the step. The ring nut 23 engages around the first section 19 of the second sleeve 17 and bears with a ring-washer-shaped end face on the second section 21 of the first sleeve 17. The second sleeve 17 is pressed against the first sleeve 13 by the ring nut 23, As a result, the first sleeve 13 is in turn pressed against the shoulder 9 of the housing 1 and thus causes the seal 15 to be clamped in such a way that it exerts its sealing effect. FIG. 2 shows a further exemplary embodiment of a cable bushing according to the invention. Owing to the large degree of correspondence with the previously described exemplary embodiment, only the differences are explained in more detail below. The step in the housing 1 is also a radially inwardly extending shoulder 9 in the exemplary embodiment illustrated in FIG. 2. However, the sealing means between the housing 1 and the first sleeve 11 is not provided by means of a seal clamped in between the shoulder 9 and the first section 13 of the first sleeve 11 but rather by means of an inner edge 25 of the shoulder 9 onto which the first section 13 of the first sleeve 11 is pressed by the ring nut 23. A spring 27, which exerts a force on the first sleeve 17 in the direction facing the step is preferably clamped in by the attachment element. In the exemplary embodiment illustrated in FIG. 2, the spring 27 is clamped in between the ring nut 23 and the second sleeve 17. The spring 27 brings about that a force which acts on the first sleeve 11 through the ring nut 23 and is necessary for the sealing means, is relatively constant and sufficiently large even if the cable bushing is exposed to large temperature fluctuations which lead to different degrees of thermal expansion of the individual components of the cable bushing.

Figure 3:
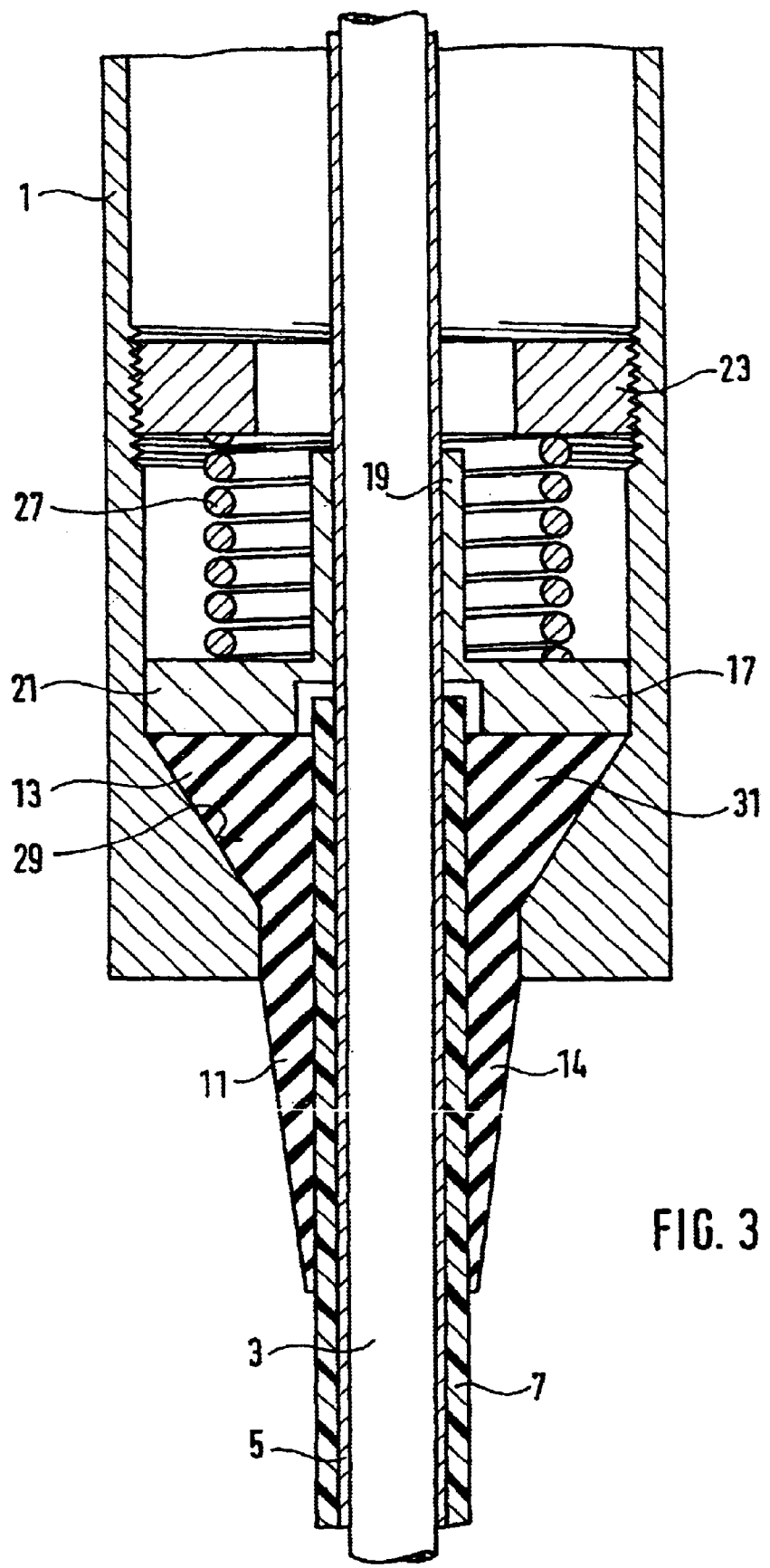
FIG. 3 shows a schematic view of a cable bushing having a first sleeve made of an elastomer, which first sleeve bears in a seal-forming fashion against the cable and against the housing.

FIG. 3 shows a further exemplary embodiment of a cable bushing according to the invention. Owing to the large degree of correspondence with the exemplary embodiments described above, here too only the differences are explained in more detail below.

In the exemplary embodiment illustrated in FIG. 3, the step in the housing 1 has a conical inner casing surface 29 whose diameter decreases in the direction of the first end of the housing 1. The first sleeve 11 is composed of an elastomer, for example of a rubber, and the first section 13 of the first sleeve 11 has a conical region 21 which is conforming with the conical inner casing surface 29. The first sleeve 11 is pressed by the ring nut 23 against the step in the housing 1 in such a way that the conical region 31 of the step 11 is forced into the conical casing surface 29 of the housing 1, and the first sleeve 11 bears in a seal-forming fashion against the housing 1 and against the cable 3.

Here too, a spring 27 is provided between the ring nut 23 and the second sleeve 17, said spring 27 ensuring that, even when there are different degrees of thermal expansion of the individual components of the cable bushing, a sufficient force is always exerted on the first sleeve 11 in the direction facing the step, in order to ensure the seals between the sleeve 11 and the cable 3 and between the sleeve 11 and the housing 1.

Figure 4:
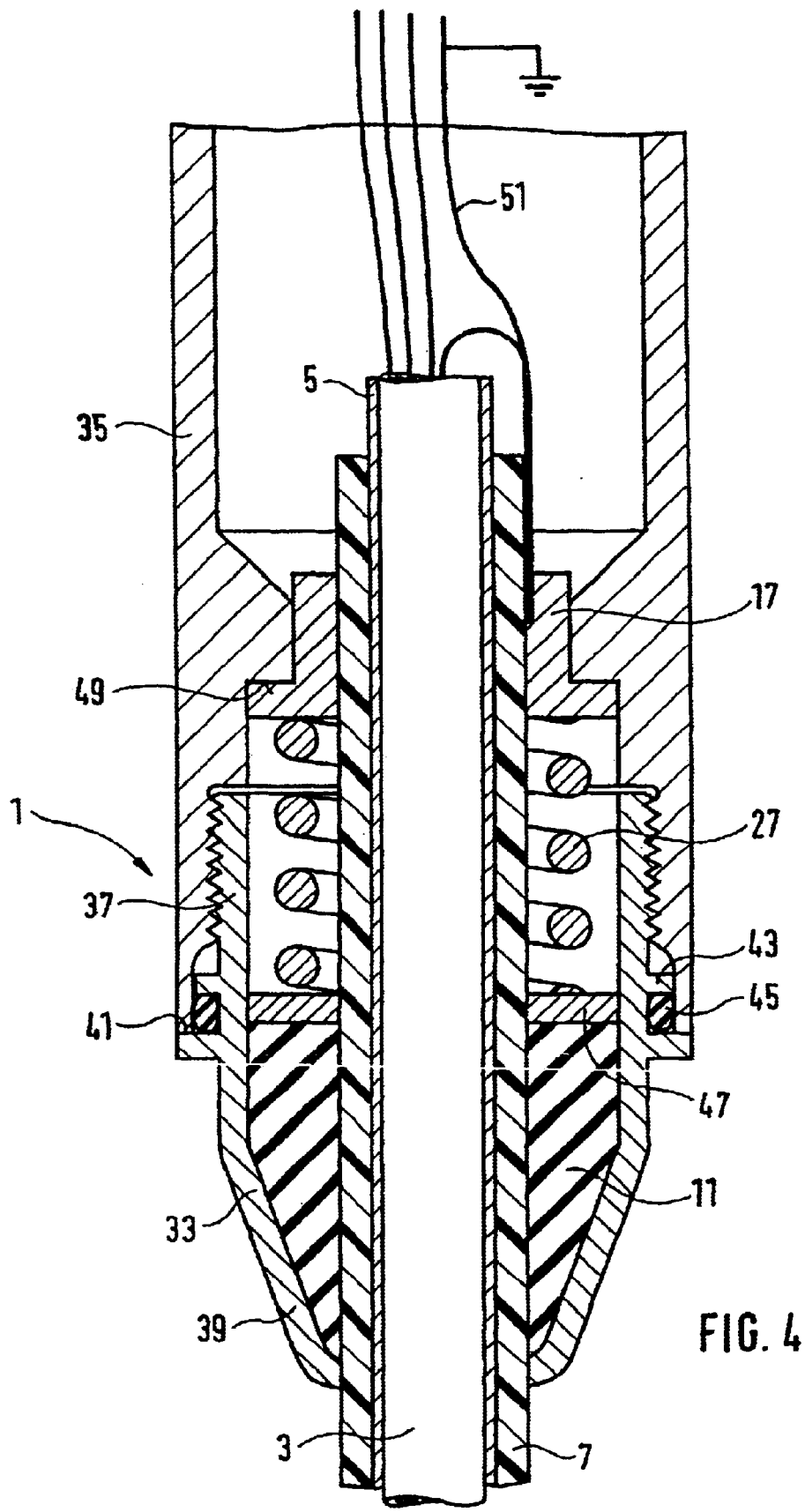
FIG. 4 shows a schematic view of a cable bushing in which the housing has two parts screwed to one another.

FIG. 4 shows a further exemplary embodiment of a cable bushing according to the invention. Owing to the large degree of correspondence with the previously described exemplary embodiment, here too, only the differences are explained in more detail below.

In the exemplary embodiment illustrated in FIG. 4, the housing 1 has a first part 33 surrounding the first end, and a second part 35. The first part 33 has a cylindrical section 37 and an adjoining conical section 39 which tapers in the direction of the first end of the housing 1 to the external diameter of the cable 3. The conical section 39 forms the step in the housing 1 by means of which the first sleeve 11 is held in the interior of the housing 1. The first sleeve 11 is arranged completely within the conical section 39, Here too it is composed of an elastomer, for example rubber, and bears in a seal-forming fashion against the housing 1 and the cable 3. For this purpose, the first sleeve 11 engages closely around the cable 3 and has an externally cylindrical region facing away from the step and an externally conical region which faces the step and tapers in the direction facing the step to the external diameter of the cable 3.

The second part 35 of the housing 1 is screwed onto the first part 33 in the direction facing the step. For this purpose, an external thread is provided on the cylindrical section 37. In the direction facing the step, underneath the external thread, a radially outwardly extending stop 41 is provided, against which the second part 35 is screwed.

In the direction facing away from the step, above the stop 41, a radially outwardly extending shoulder 43 is provided inside the second part 35, which shoulder 43 forms, together with the stop 41, a groove for receiving a seal 45. The seal 45 ensures that an annular-cylindrical gap between the two housing parts is sealed.

In the interior of the housing 1, a spring 27 is arranged between the first and second sleeves 11, 17. The spring 27 bears on an annular plate 47 which bears on the first sleeve 11. The annular plate 47 provides the advantage that a force exerted by the clamped-in spring 27 is transmitted in the direction facing the step uniformly to the sleeve 11.

The force which is necessary for clamping in the spring 27 is applied by means of the attachment element. In the exemplary embodiment illustrated in FIG. 4, the attachment element is a radially inwardly extending step 49 which is arranged in the interior of the second part 35 and which bears on the second sleeve 17. As a result of the second part 35 being screwed onto the first part 33, the step 49 presses the second sleeve 17 in the direction facing the step.

In the exemplary embodiment illustrated in FIG. 4, the metallic shield 5 is not a stable metallic wire mesh but rather a thin metal foil. The second sleeve 17 is fitted onto the outside of the cable jacket 7 of the cable 3 and pressed with the cable 3. On a side of the second sleeve 17 facing away from the step, the cable jacket 7 is removed and the lines are exposed. A filler stranded conductor 51 which is electrically conductively connected to the metallic foil has a blank line element which is clamped in between the cable jacket 7 of the cable 3 and the second sleeve 17. There is thus, as in the previously described exemplary embodiments, an electrically conductive connection between the housing 1 and the metallic shield 5 by means of the second sleeve 17. Laying a filler stranded conductor between the cable jacket 7 and the second sleeve 17 can, of course, also be used to form the desired electrical connection in the previously described exemplary embodiments.

What is claimed is:

1. A cable bushing for a probe, having:

a cable;

a housing defining a first end including a step which extends radially inward, said cable extending through said housing;

a first sleeve, which engages around said cable and has a first section arranged inside of said housing, said first sleeve being held in said housing by said step, said first sleeve bearing against said cable in a seal-forming fashion;

sealing means provided between said step in said housing and said first sleeve;

a second sleeve arranged in said housing, said second sleeve having a first cylindrical section which engages closely around said cable, and a second section of larger diameter than the first cylindrical section which adjoins an end of said first section which faces said step, said second sleeve bears on said first section of said first sleeve; and an attachment element which acts directly or indirectly on said second sleeve which itself acts directly or indirectly on said first sleeve.

2. The cable bushing as defined in claim 1, wherein:

said attachment element comprises a ring nut which is screwed into said housing in the direction facing said step.

3. The cable bushing as defined in claim 1, wherein:

said second sleeve is metallic, and is pressed with said cable in order to provide strain relief to said cable.

4. The cable bushing as defined in claim 1, further comprising:

a metallic shield, wherein:

said cable is surrounded on the outside by said metallic shield;

said second sleeve is metallic; and said second sleeve forms an electrically conductive connection between said housing and said metallic shield.

5. The cable bushing as defined in claim 1, wherein:

said first sleeve is plastic;

said cable has a coating made of plastic; and said first sleeve is welded to said coating.

6. The cable bushing as defined in claim 1, wherein:

said step in said housing comprises a radially inwardly extending shoulder; and;

said sealing means is a seal which bears on said shoulder, and is clamped between said shoulder and said first section of said first sleeve.

* * * * *